United States Patent [19]
Hartmann et al.

[11] Patent Number: 5,785,368
[45] Date of Patent: Jul. 28, 1998

[54] VEHICLE WITH IMPACT PROTECTION UNIT

[76] Inventors: Albrecht Hartmann, Schneeglöckchenstr. 85a, D-80992 München; Jörg R. Bauer, Gablerstr. 4, D-88250 Weingarten, both of Germany

[21] Appl. No.: 628,387

[22] Filed: Apr. 5, 1996

[30]  Foreign Application Priority Data

Apr. 4, 1995 [DE] Germany .................. 195 12 600.9

[51] Int. Cl.[6] ............................................. B60R 19/20
[52] U.S. Cl. ............................................. 293/134
[58] Field of Search .................... 293/1, 102, 106, 293/107, 118, 119, 132, 133, 134; 267/116

[56]  References Cited

U.S. PATENT DOCUMENTS 4,352,514  10/1982  Orima ................................... 293/134
4,518,183   5/1985  Lee ...................................... 293/134
5,042,859   8/1991  Zhang et al. ......................... 293/134

Primary Examiner—Stephen Avila
Attorney, Agent, or Firm—Robert W. Becker & Associates

[57]  ABSTRACT

A vehicle has a frame enclosing the usable space of the vehicle. An extendable impact protection unit is connected to the frame. The extendable impact protection unit has an extendable member and a telescopic device for extending and retracting the extendable member relative to the frame. The extendable impact protection unit, when extended, enlarges the outer contour of the vehicle and provides a deformation zone for absorbing impact forces in order to protect the usable space. The telescopic device has at least two extendable components engaging different locations of the extendable member and having a travel stroke from a retracted position into an extended position. The at least two extendable components have an impact compensation capacity. The vehicle also includes a device for adjusting at least one of the impact compensation capacity and the travel stroke independently for each one of the at least two extendable components.

17 Claims, 6 Drawing Sheets

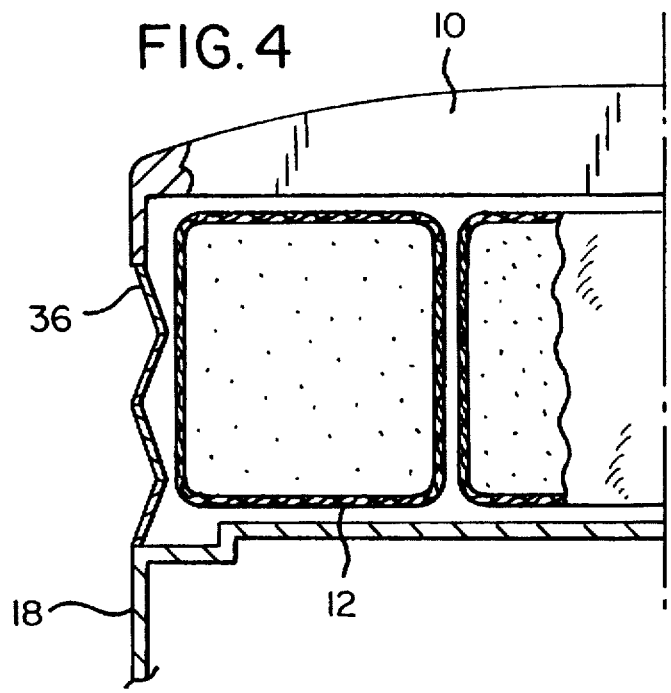
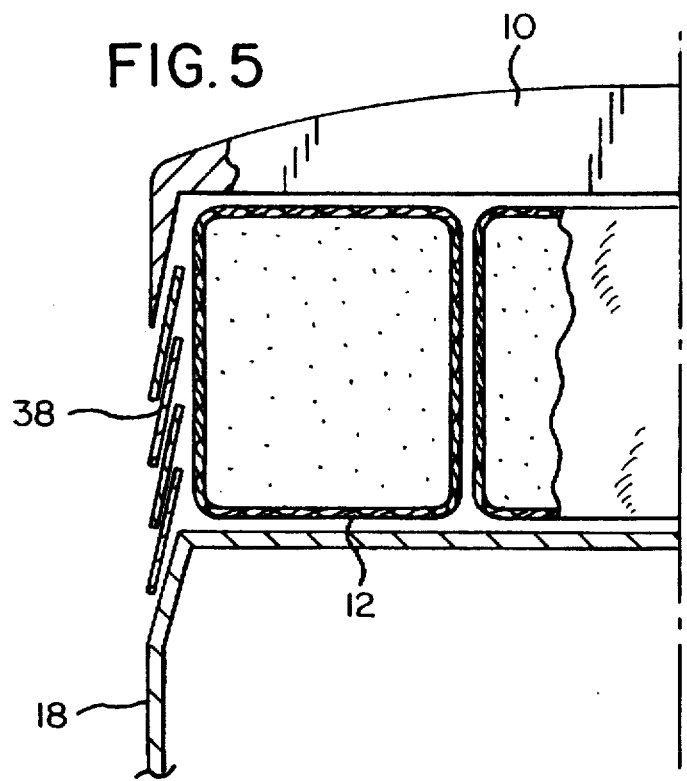

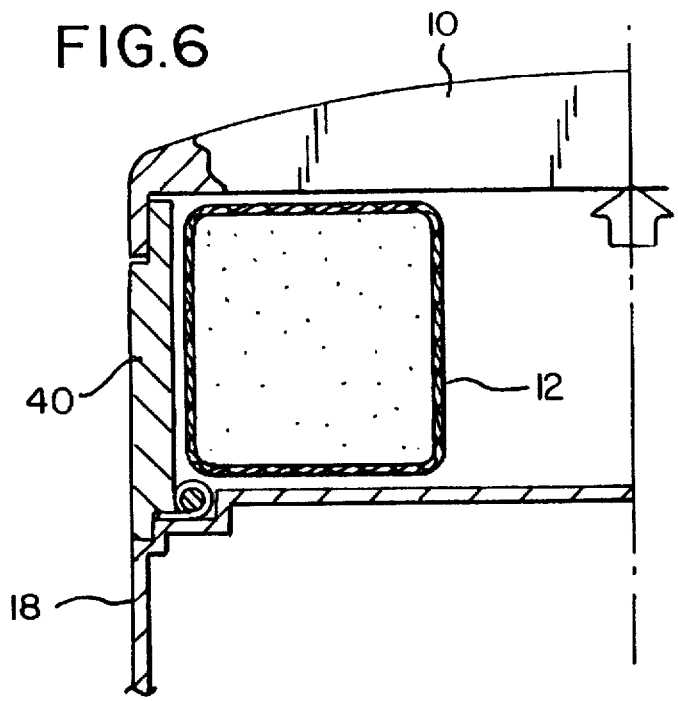
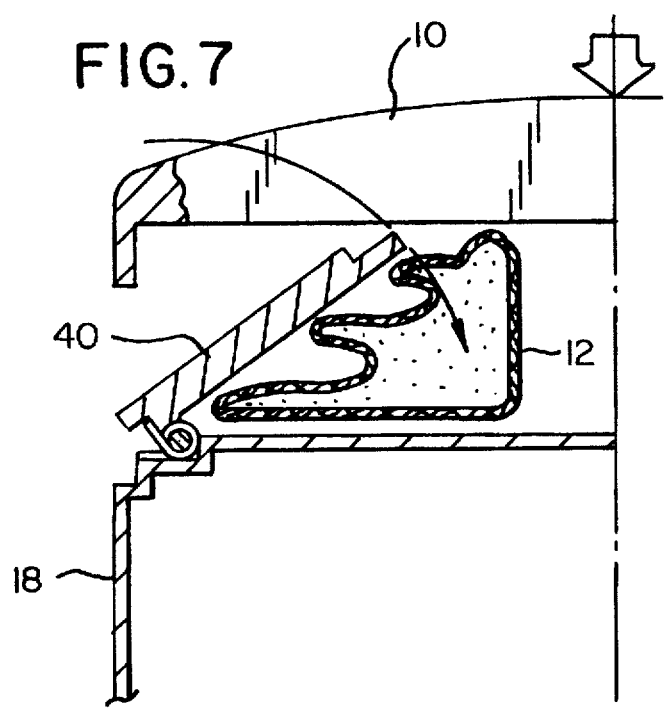

FIG. 9
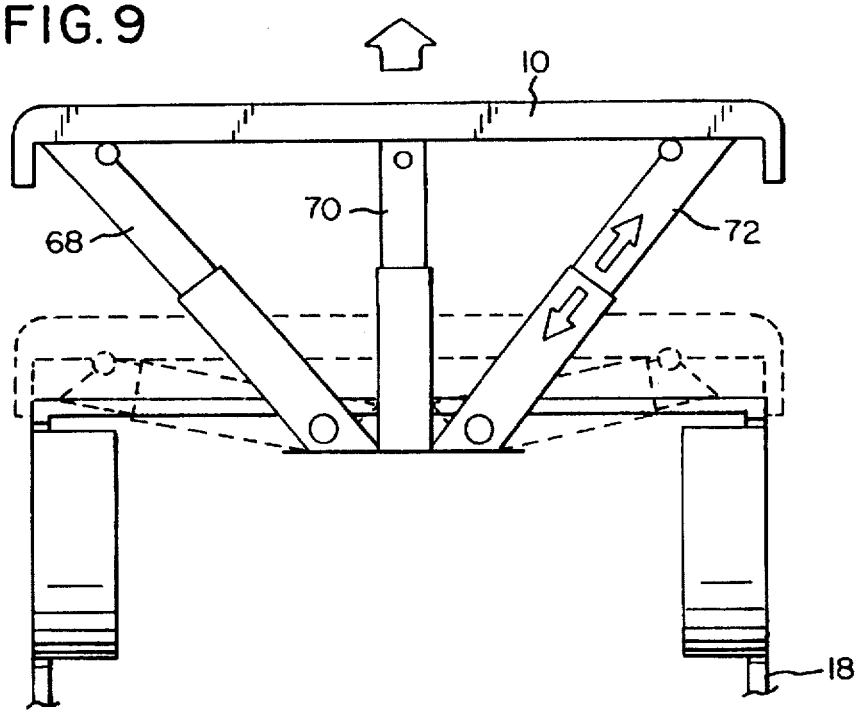
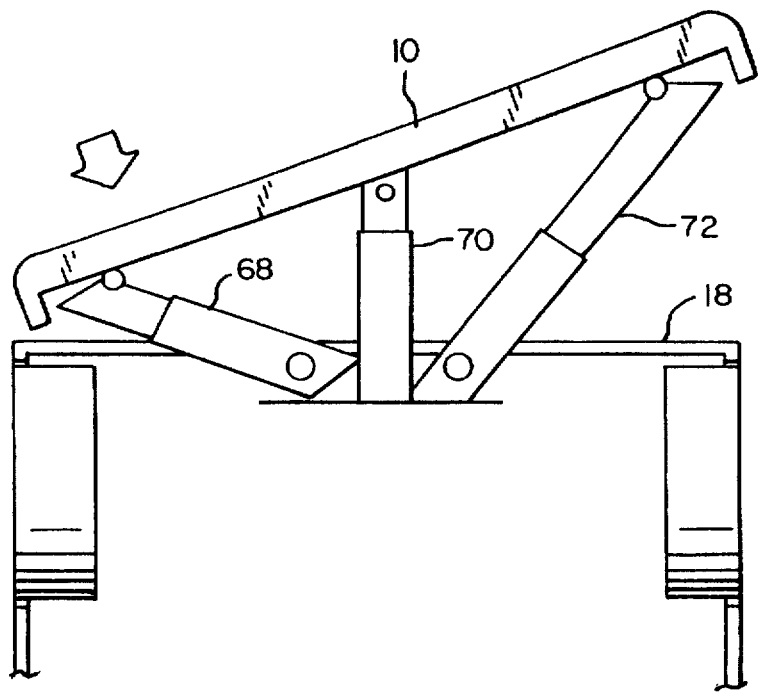

VEHICLE WITH IMPACT PROTECTION UNIT

BACKGROUND OF THE INVENTION

The present invention relates to a vehicle, especially a compact vehicle, comprising a deformation-resistant frame that encloses the useable space (passenger compartment, cargo space) of the vehicle and an impact protection unit which comprises an extendable member and a telescopic device connected between the extendable member and the frame so that by extending the extendable member the outer contour of the vehicle is enlarged and during collision a deformation zone is provided the deformation of which protects the useable space of vehicle.

In a know vehicle according to German patent application 44 39 120 A1 the extendable member is an areal member that comprises the bumper and the front end of the body of a compact vehicle. This entire member is extended preferably by a telescopic device operated with an airbag whereby the energy compensation capacity of the telescopic device is depends, for example, on the velocity of the vehicle. The known impact protection unit has the disadvantage that it can not be adapted to different accident conditions. For example, when the impact protection unit is designed to protect against a front impact, as defined by government regulations, this results, in general, in that upon an impact at an angle only too little energy is compensated so that the passengers within the vehicle are at risk.

It is therefore an object of the present invention to improve a vehicle of the aforementioned kind such that in many accident situations an optimal protection of the vehicle passengers as well as of other persons involved in the accident can be achieved.

SUMMARY OF THE INVENTION

The vehicle according to the present is primarily characterized by:
- a frame enclosing usable space of the vehicle;
- an extendable impact protection unit connected to the frame;
- the extendable impact protection unit comprising an extendable member and a telescopic device for extending and retracting the extendable member relative to the frame, wherein the extendable impact protection unit when extended enlarges an outer contour of the vehicle and provides a deformation zone for absorbing impact forces in order to protect the usable space;
- the telescopic device comprising at least two extendable components engaging different locations of the extendable member and having a travel stroke from a retracted position into an extended position;
- the at least two extendable components having an impact compensation capacity; and
- means for adjusting at least one of the impact compensation capacity and the travel stroke independently for each one of the at least two extendable components.

Preferably, the extendable member is comprised of at least two parts and one of the at least two of the extendable components engages one of the at least two parts, respectively.

Preferably, the extendable member is connected to the front end of the vehicle and has a central part and two lateral parts.

The extendable member when connected to the front end of the vehicle may also comprise a part extendable in a forward and downward direction.

The extendable member is preferably an areal member and comprises a soft outer layer.

Preferably, the vehicle further comprises a sensor device for controlling the impact compensation capacity.

Preferably, the sensor device detects the velocity of the vehicle or the deceleration of the vehicle. It may also detect an oncoming obstacle. In another embodiment of the invention the sensor device detects a relative movement between the frame and the extendable member positioned in the extended position.

Preferably, the extendable member is comprised of at least two parts. One of the at least two extendable components engages one of the at least two parts, respectively. The sensor device detects a relative movement between the frame and each one of the at least two parts.

At least one of the extendable components comprises an airbag. The extendable member is extended by applying pressure to the airbag and retracted by applying vacuum to the airbag. In another embodiment of the present invention, the extendable components are extended by applying pressure to the airbag and retracted by applying vacuum to the airbag.

Advantageously, the outer contour of the vehicle in the extended position of the extendable member is formed at least partially by the airbag.

The extendable impact protection unit is a premounted module fastened to the frame.

With the present invention it is possible to adjust the impact compensation capacity by a directed adjustment of the at least two of the extendable components of the telescopic device to the respective requirements. For the adjustability various adjusting possibilities are feasible; for example, during operation in pedestrian areas, each extendable component can be adjusted manually so as to be especially soft so that pedestrians on impact are subjected to a minimal risk.

BRIEF DESCRIPTION OF THE DRAWINGS

The object and advantageous of the present invention will appear more clearly from the following specification in conjunction with the accompanying drawings, in which:

FIGS. 4 to 7 show different embodiments of the unit according to FIG. 2;

FIG. 9 shows a further embodiment of the impact protection unit.

DESCRIPTION OF PREFERRED EMBODIMENTS

The present invention will now be described in detail with the aid of several specific embodiments utilizing FIGS. 1 through 9.

Figure 1:
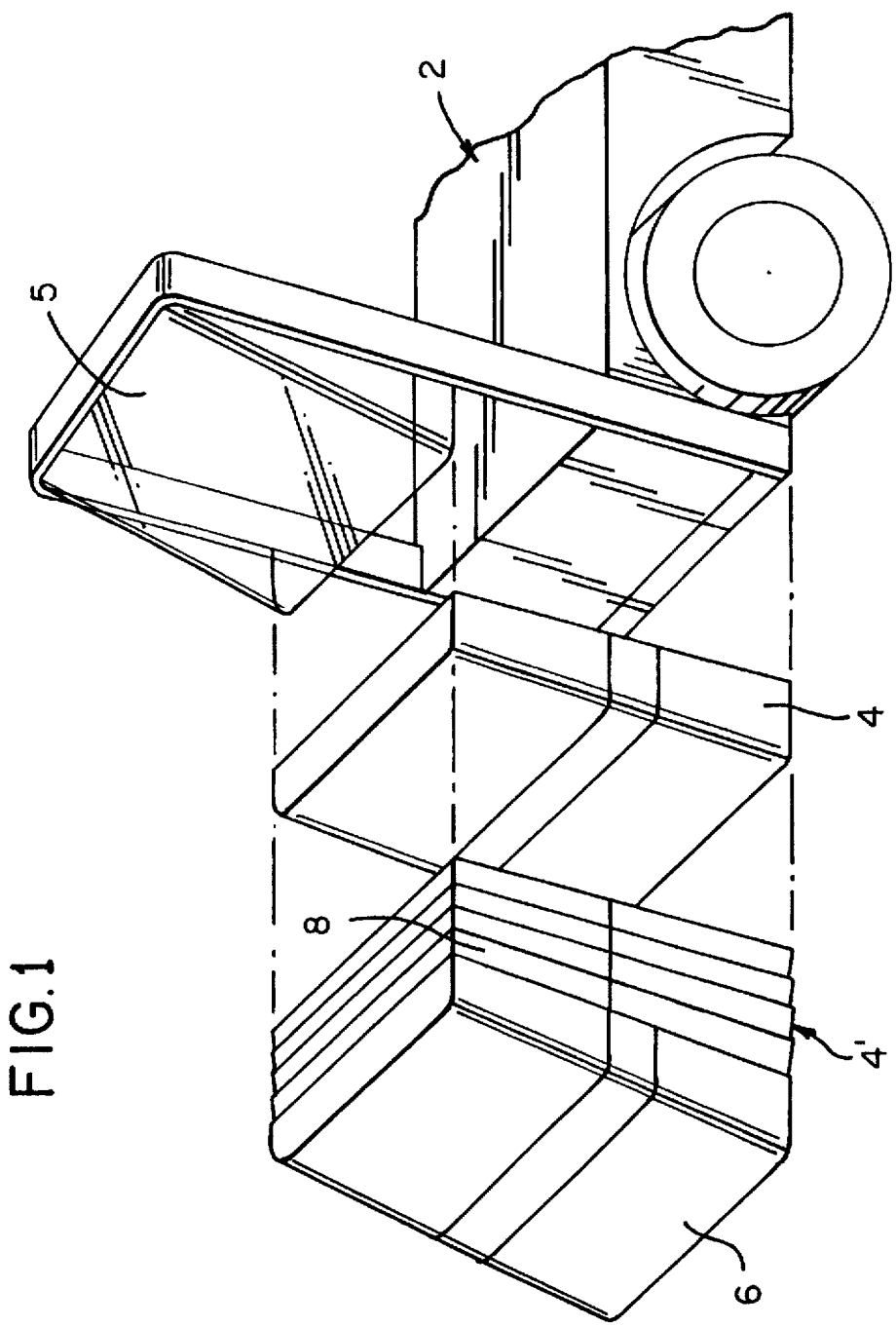
FIG. 1 shows a simplified schematic perspective view of an impact protection unit in the extended and retracted positions.

According to FIG. 1, the impact protection unit 4 mounted to the front end of the represented vehicle 2 is positioned below the windshield 5 and formes the outer contour of the vehicle. The impact protection unit 4 in FIG. 1 is represented in the extended position and in the mounted state is flush with the windshield 5. The reference numeral 4' indicates the impact protection unit 4 in the extended position in which the space between the front part 6 in the form of a protective shield and the actual vehicle structure is closed off by slats 8. The front part 6 is supported with a telescopic device at the frame so that in the case of a collision a deformation travel stroke is available with which during deformation, given a suitable embodiment of the front part 6 and of the telescopic device, sufficient energy is absorbed.

In the following Figures, the extendable member is not represented in detail. It can be an areal member in the form of a protective shield or simply in the form of a bumper or a segment.

Figure 2:
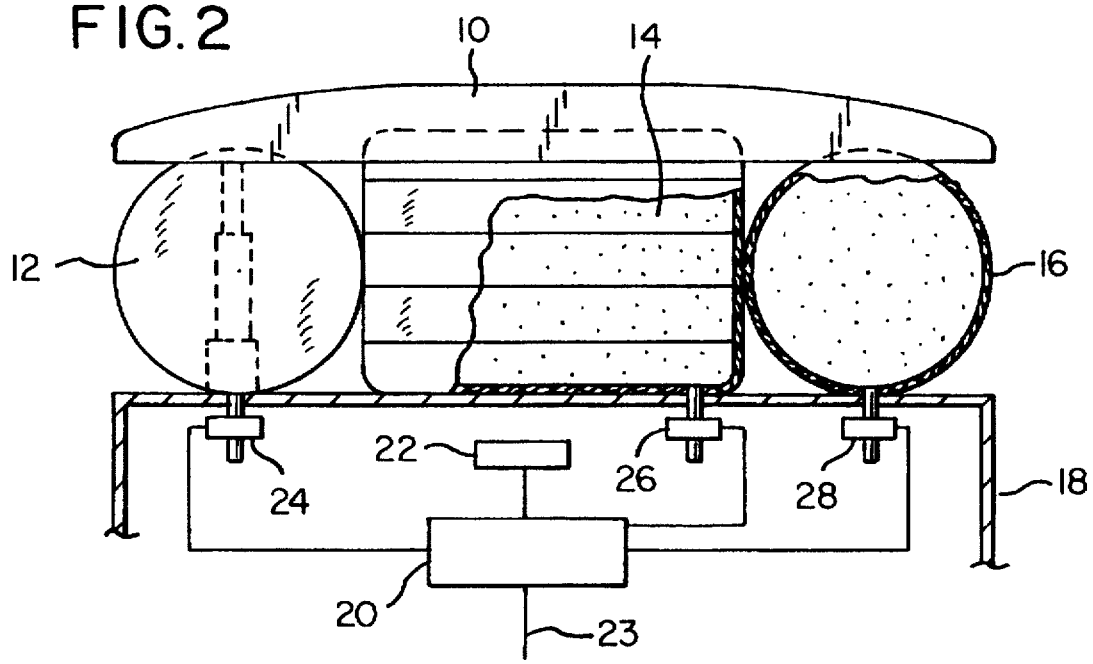
FIG. 2 shows a first embodiment of an impact protection unit.

According to FIG. 2, showing schematically a horizontal sectional view, the extendable member 10 is supported via three airbags 12, 14, 16 at the frame 18. For guiding the extendable member 10, a telescopic device comprising extendable components is provided one of which is represented below the airbag 12 in a dashed line. The two lateral airbags 12 and 16 are cylindrical or spherical while the centrally arranged large airbag 14 has a parallelepipedal structure and may be divided by partitions into individual chambers.

For extending and retracting the member 10, the airbags are filled or emptied with a non-represented pump/vacuum pump and/or by a mechanical device that operates pneumatically, hydraulically, or electromotorically.

For a directed adjustment of the impact compensation capacity of the airbags 12, 14, 16, a control device 20 is provided having ports connected to a sensor 22 and optionally further sensors 23. The outlets are connected to controllable outlet valves 24, 26 and 28. The sensor 22 may for example may be an optical sensor (camera with picture detection). The further sensor 23 may be employed to send a signal with regard to the velocity of the vehicle.

Figure 3:
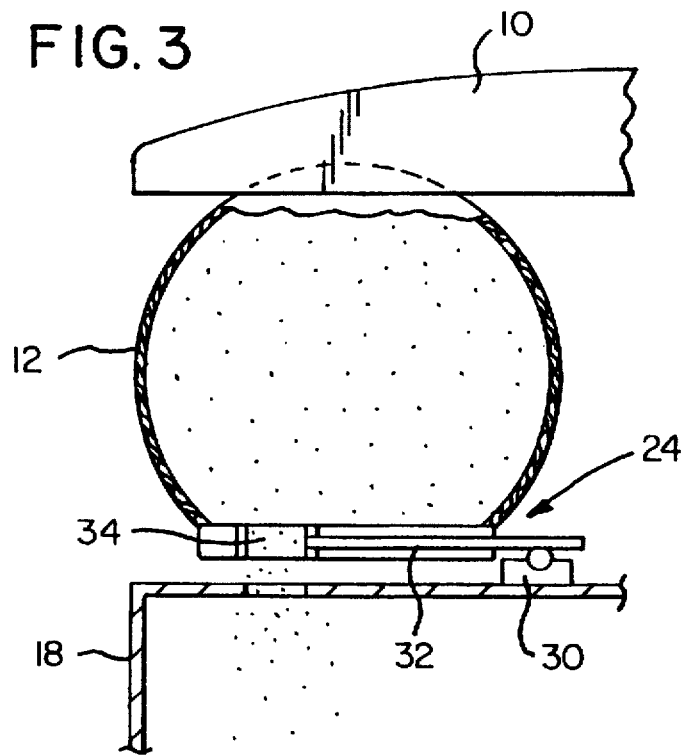
FIG. 3 shows a detail of the unit according to FIG. 2.

FIG. 3 shows in an exemplary manner the outlet valve 24 with an electric motor 30 for actuating a slide 32 which closes to a greater or smaller extent the outlet opening of the airbag 12.

The function of the aforedescribed device is as follows:

It is assumed that the sensor 22 detects an obstacle which will impact centrally according to FIG. 2, for example, another vehicle, whereby its relative velocity is also detected. Within the control device 20 the respective adjusting values for the outlet valves 24, 26 and 28 are then determined by using correspondingly defined characteristic data such that the outlet valves are adjusted in a manner which allows for the absorption of as much energy as possible, i.e., the deformation travel stroke available should be optimally employed with regard to the possible impact compensation capacity. When, instead, it is detected that a motorcycle will impact from the left at an angle, the left outlet valve 24 will be adjusted to provide a relatively large through opening, i.e., the airbag 12 is very soft. During operation in a pedestrian area, all of the outlet valves are adjusted to have a great cross-section. When a hard obstacle impacts, for example, a tree impacting from the right, the right airbag 16 is greatly inflated to be very hard but so that the other two airbags also absorb energy. In this manner it is possible to adapt the impact compensation capacity of the impact protection unit to the respective requirements, i.e., the impacting object, the direction of impact, and the required energy compensation.

In the embodiment according to FIG. 4 the left airbag 12 is also of a parallelepipedal shape. The space between the extendable member 10 and the frame 18 is closed off by a folded wall 36. In the embodiment according to FIG. 5, this space is closed off by slats 38 which are positioned so as to be slidable relative to one another.

FIGS. 6 and 7 show one embodiment in which a flap 40 is connected to the frame of the vehicle with a hinge that is spring-loaded. In the extended position of the member 10 the flap 40 closes off the space between the extendable member 10 and the frame 18. Upon retracting the member 10, the flap 40 remains, due to the spring loading action, in abutment with the shrinking airbag 12 so that the member 10 is retracted relative to the vehicle frame 18. The embodiment according to FIGS. 6 and 7 has the additional advantage that the flap 40 can compensate energy of lateral impact whereby this energy compensation takes place primarily via the airbag 12 while the energy consumption during frontal impact takes place via the member 10 and the three airbags 12, 14 and 16 as well as for a suitable construction additionally via the flap 40.

Figure 8:
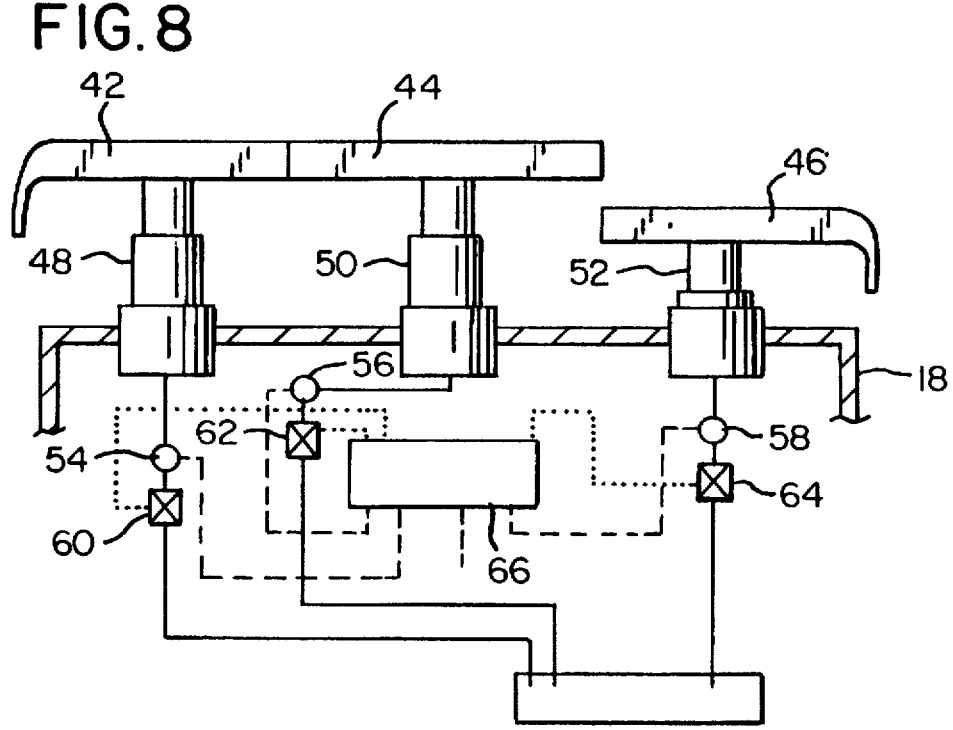
FIG. 8 shows a variation of the impact protection unit.

FIG. 8 shows one embodiment in which the extendable member 10 is comprised of three parts 42, 44, and 46. For each of the parts 42, 44, and 46 the telescopic device provides an individual telescopic hydraulic component 48, 50, and 52. In FIG. 8 the solid lines indicate the return lines of the hydraulic units in which flow sensors 54, 56, 58 and controllable outlet valves 60, 62, 64 are positioned. The connection to a control device 66 is realized with connecting lines that are indicated with dashed or dotted lines.

With the disclosed device it is possible to extend the parts 42, 44, and 46 to different degrees and to individually adjust the respective energy compensation capacity of the hydraulic units 48, 50, and 52. For example, in an impact situation it is possible to detect via the flow sensors 54, 56, 58 the relative movement between the corresponding parts 42, 44, and 46 and the frame 18, and, as a function of this relative movement and the actual vehicle velocity, to control the flow cross-section of the outlet valves for an optimal energy compensation action. In this manner it is possible to optimally protect the passengers of the vehicle as well as traffic participants exterior to the vehicle. It is understood that the parts 42, 44, and 46 may be provided with a common envelope and/or may be connected with hinges and/or with hydraulic units whereby the hydraulic units may be additionally pivotably connected to the frame.

FIG. 9 shows a further embodiment in which the extendable member 10 is supported to the frame 18 by three hydraulic cylinders 68, 70, and 72 as parts of the telescopic device. The two lateral hydraulic cylinder 68 and 72 are pivotably connected to the frame 18 and the extendable member 10, while the centrally arranged hydraulic cylinder 70 is fixedly connected to the frame 18 and is pivotably connected only to the member 10. As represented in the upper half of FIG. 9, the member 10 can be extended from the contour of the vehicle parallel to the longitudinal direction of the vehicle, or, as shown in FIG. 9 at the bottom, can be pivoted. For controlling the movement of the member 10 and the impact compensation capacity of the individual hydraulic cylinders, a control device similar to the control device 66 of FIG. 8 can be provided that is equipped with individual pressure lines. The embodiment according to FIG. 9 has the advantages that for a unitary embodiment of the member 10 a very directed yielding action can be achieved.

For the inventive embodiment of the disclosed impact protection unit a plurality of further developments is possible. The extendable member can be connected to the rear end of the vehicle or can also be connected to the sides, respectively, the doors. The vehicle, for example, can be a self-driven vehicle, such as a truck, passenger car, or bus, or a trailer. The extension of the member must not take place via hydraulic cylinders or airbags but can also be performed with a linkage driven by a motor. It is also possible to provide further extendable components, for example, a component that can be extended in the forward and downward direction in order to protect in a directed manner small children or animals. The extendable member can be provided with a soft outer layer so that especially pedestrians are additionally protected against injuries. The activating sensors can detect the velocity of the vehicle, obstacles, the relative movements between the extended member and the frame, but also deceleration and further parameters of the vehicle. The impact protection unit, when the vehicle is moving, can be extended at all times or can be extended only in dangerous situations. Advantageously, the entire impact protection unit is designed such that it is a pre-manufactured and pre-mounted module connected to the frame, for example, it can be retro-fitted to any suitable vehicle with or without its own drive means.

The present invention is, of course, in no way restricted to the specific disclosure of the specification and drawings, but also encompasses any modifications within the scope of the appended claims.

What we claim is:

1. A vehicle comprising:

a frame enclosing usable space of said vehicle;

an extendable impact protection unit connected to said frame;

said extendable impact protection unit comprising an extendable member and a telescopic device for extending and retracting said extendable member relative to said frame, wherein said extendable impact protection unit when extended enlarges an outer contour of said vehicle and provides a deformation zone for absorbing impact forces in order to protect said usable space;

said telescopic device comprising at least two extendable components engaging different locations of said extendable member and having a travel stroke from a retracted position into an extended position;

said at least two extendable components having an impact compensation capacity; and means for adjusting at least one of said impact compensation capacity and said travel stroke independently for each one of said at least two extendable components.

2. A vehicle according to claim 1, wherein said extendable member is comprised of at least two parts and wherein one of said at least two extendable components engages one of said at least two parts, respectively.

3. A vehicle according to claim 2, wherein said extendable member is connected to a front end of said vehicle and comprises a central part and two lateral parts.

4. A vehicle according to claim 1, wherein said extendable member is connected to a front end of said vehicle and comprises a part extendable in a forward and downward direction.

5. A vehicle according to claim 1, wherein said extendable member is an areal member.

6. A vehicle according to claim 1, wherein said extendable member comprises a soft outer layer.

7. A vehicle according to claim 1, further comprising a sensor device for controlling said impact compensation capacity.

8. A vehicle according to claim 7, wherein said sensor device detects a velocity of said vehicle.

9. A vehicle according to claim 7, wherein said sensor device detects a deceleration of said vehicle.

10. A vehicle according to claim 7, wherein said sensor device detects an oncoming obstacle.

11. A vehicle according to claim 7, wherein said sensor device detects a relative movement between said frame and said extendable member positioned in said extended position.

12. A vehicle according to claim 11, wherein:

said extendable member is comprised of at least two parts;

one of said at least two extendable components engages one of said at least two parts, respectively; and said sensor device detects a relative movement between said frame and each one of said at least two parts.

13. A vehicle according to claim 1, wherein at least one of said extendable components comprises an airbag.

14. A vehicle according to claim 13, wherein said extendable member is extended by applying pressure to said airbag and retracted by applying vacuum to said airbag.

15. A vehicle according to claim 13, wherein said extendable components are extended by applying pressure to said airbag and retracted by applying vacuum to said airbag.

16. A vehicle according to claim 13, wherein the outer contour of said vehicle in said extended position of said extendable member is formed at least partially by said airbag.

17. A vehicle according to claim 1, wherein said extendable impact protection unit is a pre-mounted module fastened to said frame.

\* \* \* \* \*